March 14, 1961 D. C. WEBER 2,975,005
HYDRAULIC THRUST BEARING
Filed July 20, 1959

INVENTOR.
DAVID C. WEBER
BY
Beehler & Shanahan
ATTORNEYS

United States Patent Office 2,975,005
Patented Mar. 14, 1961

2,975,005

HYDRAULIC THRUST BEARING

David C. Weber, 6731 6th Ave., Los Angeles, Calif.

Filed July 20, 1959, Ser. No. 828,234

5 Claims. (Cl. 308—9)

This invention relates generally to hydraulic thrust bearings, and more particularly to a hydraulic thrust bearing in which bearing liquid is supplied to upper and lower bearing cups by rotation of a supported shaft in either direction, and in which the bearing liquid is released from at least one of the bearing cups through a plurality of radial openings which increase in size with longitudinal displacement of the supported shaft.

A popular pump for irrigation purposes is the submersible pump which is suspended under water at the end of a vertical discharge pipe. Such pumps have the great advantage that they are not limited to the usual thirty-two foot suction limit. They are usually constructed in a series of pump bowls, suspended directly from the end of the discharge pipe, and adapted to withdraw water from the surrounding well or lake bottom, and force it up to the surface through the discharge pipe when rotationally driven by an electric motor suspended beneath the bowls, and powered through a waterproof cable extending from a power source at ground level.

It will be obvious, of course, that submersible pumps may find uses with fluids other than water, and may find utility in non-irrigation applications. The most practical construction for the submersible pump is one which permits some longitudinal movement of the vertical shaft which is common to both the pump bowls and the electric motor.

Also, it will be appreciated that the vertical rotating system of pump and motor must be provided with a very substantial thrust bearing in order to support the great weight of the column of water standing above it in the discharge pipe.

Unfortunately, the bottom of a well or lake does not provide ideal conditions for bearing survival. Gravel and sand get into bearings and wear them out after relatively short periods of wear, unless they are entirely enclosed. Consequently, the most practical construction for submersible pumps has proven to be the hermetically sealed motor system. In said systems, the motor is cooled by means of a clean, permanently sealed-in cooling liquid, usually an emulsion of oil and water, which serves both to cool and to lubricate.

Also, at times in the past, it has been proposed to use so-called hydraulic thrust bearings, in which the pressure of liquid was used as the thrust bearing support. However, in the past, such thrust bearings have not been successful in hermetically sealed systems. Sometimes they have been destroyed when the pump failed to deliver sufficient pressure momentarily. In other cases they have been damaged by too much pump pressure when the speed of rotation of the motor momentarily exceeded its rated speed. For example, it can happen that when power to the motor is shut off, that a backflowing column may reverse the rotation of the pump and drive it in the opposite direction at a rate faster than would have been expected if the pump were always driven by electric power.

It is therefore an important requirement, not met by previously known submersible pumps, that any hydraulic thrust bearing therein must be hermetically sealed, and at the same time must adjust automatically to deficiencies or excesses in pressure without damage to the bearing system.

It is a major object of the present invention to provide a hydraulic thrust bearing in which the supported shaft has mounted upon it a bearing rotor which floats in fluid under pressure at both its upper and lower ends, and has adjustable valve means for pre-setting upper and lower bearing liquid pressures, and is constructed with discharge openings increasing in cross-section as pressure increases.

Other objects of the invention include the provision of a simple and continuous supply of bearing liquid directly through the bearing rotor itself.

Still another object of the invention is to provide a mechanical thrust bearing for conditions of emergency or rest, which can be received within the hydraulic thrust bearing system and can serve, therein, to limit the closure of the discharge passages to a predetermined cross-section.

The foregoing and other objects of the invention are realized in a manner which will best be understood from the following description of a preferred specific embodiment, read in connection with the accompanying drawings in which.

Figure 1:
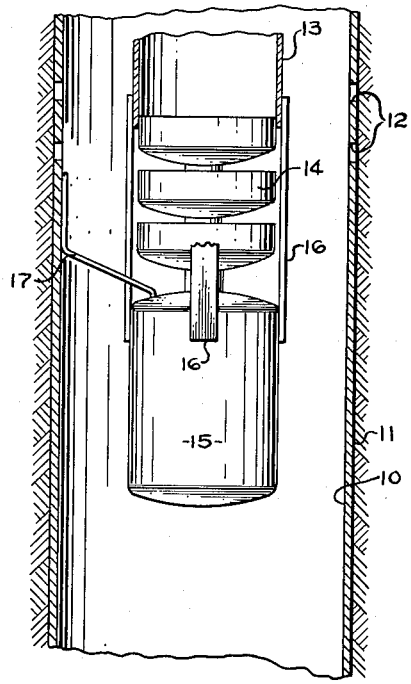
Figure 1 is a front elevational view of a submersible pump and submersible pump motor suspended at the lower end of a discharge pipe within a pump casing, said pipe and pump casing being shown in vertical section.

In Figure 1, a well bore 10 is lined with a steel casing 11, which may have openings as indicated at 12, and is filled with water. A discharge pipe 13, seen in section, is hanging down the well bore 10 from the ground surface level. At the lower end of the discharge pipe 13, a series of three pump bowls 14, and below them, an electric motor housing, are suspended by means of four brackets 16.

A waterproof electric cable 17 leads down the well bore 10 from a power source at ground level to the housing 15.

Figure 2:
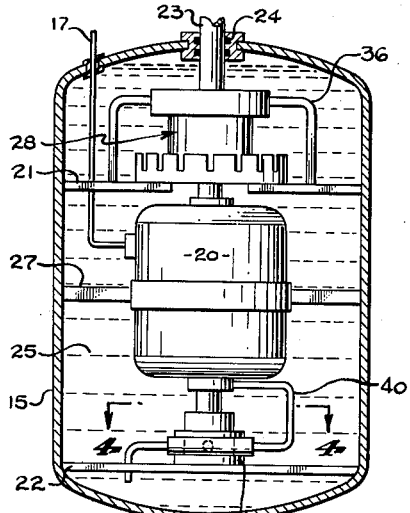
Figure 2 is a vertical sectional view through the motor housing of the submersible pump of Figure 1, showing the motor and hydraulic thrust bearing mounted within the housing.

The vertical sectional view of Figure 2 reveals the interior of the hermetically sealed housing 15. An electric motor 20 is supported in the central part of the housing interior by means of horizontal support brackets 21 and 22. A shaft 23, which serves as the common shaft for both the motor 20 and the impellers within pump bowls 14, extends out of the hermetically sealed housing through a sealing packing 24.

The interior of the hermetically sealed housing 15 is filled with a liquid 25 which serves several purposes, as will be described hereinafter.

A circulating pump 26 for circulating liquid 25 is supported on the lower horizontal bracket 22.

The motor 20 is fastened against rotation by a support spider 27.

The weight of the entire water column in discharge pipe 13 bears down upon the shaft 23, and is supported on the thrust bearing system 28.

Figure 3:
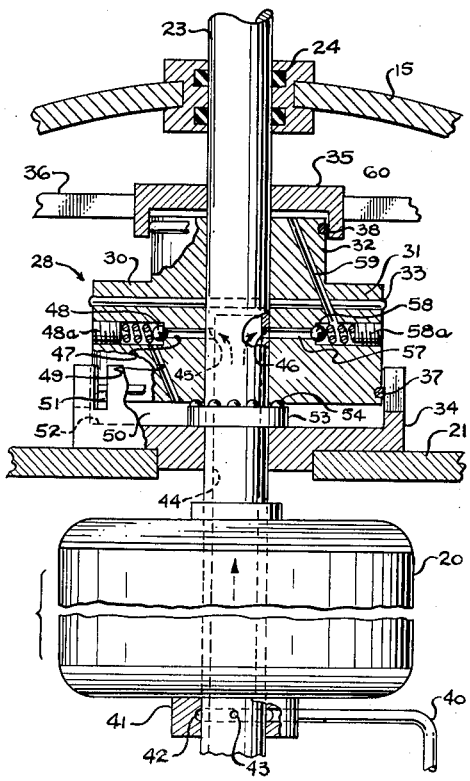
Figure 3 is a vertical sectional view through the hydraulic thrust bearing, and some related parts, revealing the construction of the illustrated embodiment of the invention.

The sectional view of Figure 3 reveals the internal construction of the thrust bearing system 28. A thrust bearing rotor 30, having a relatively large lower piston 31 and relatively small upper piston 32 is mounted on the shaft 23 and is fastened to mount integrally therewith by means of through-pin 33.

Rotor 30 is positioned between an upwardly opening cylindrical lower bearing cup 34, supported on horizontal support bracket 21, and an inverted upper bearing cup 35, which is supported above the supporting bracket 21 by a support spider 36 (see Figure 2).

Lower and upper bearing cups 34 and 35, respectively, closely receive the lower and upper pistons 31 and 32 of rotor 30, and are provided with steel sealing rings 37 and 38 respectively so as to provide close sealing against the unwanted escape of liquid regardless of the rotational or longitudinal movement of rotor 30.

The rotor 30, together with the shaft 23 and the column of water supported by it, is supported in a floating manner between the bearing cups 34 and 35 by liquid introduced into said bearing cups under pressure. The liquid 25 is pumped by circulating pump 26 through a system of valves to be described hereinafter, through a supply line 40 to a collar 41 which has an internal annular groove 42 encircling the lower end of shaft 23.

The liquid passes from annular groove 42, through wall openings 43 into the interior of the shaft 23, which is tubular in its lower portion.

The liquid passes up through the interior bore 44 of the shaft 23 to a pair of openings 45 and 46, located near the middle of the rotor 30.

Liquid from opening 45 passes through radial passage 47, and through check valve 48 to a descending passage 49, to discharge liquid under pressure into the interior 50 of the lower bearing cup 34. The liquid then escapes from the bearing cup 34 through a plurality of vertical slots 51, which extend downwardly from the upper edge of the side wall thereof to a point spaced above the bottom 52 of the lower bearing cup 34.

Threaded plugs 48a and 58a can be used to adjust the spring compression of valves 48 and 58, thereby providing predetermined adjustment of the passage of liquid to the lower and upper bearing cups 34 and 35, respectively.

It will be seen that the discharge openings 51 increase in cross-sectional area whenever the rotor 30 is forced to rise vertically by the pressure of fluid in the cup interior 50. Under ordinary operating conditions, the rotor 30 tends to float with its bottom piston 31 some place between its lowest possible point and its highest possible point, and is kept in balance by the escape of liquid through the opening 51.

A mechanical thrust bearing 53 is located on the bottom 50 of the lower bearing cup, and is provided with thrust bearing balls or rollers 54, which bear against the underside of the lower piston portion 31 of the rotor 30, and establish a minimum elevation for the rotor 30.

It will be understood, that the minimum opening indicated at 51 is greatly exaggerated for purposes of illustration. Indeed, it is within the scope of the invention, to have the lowest resting point of the rotor 30 bring the underside of the lower piston portion 31 below the bottom of the slot 51; in such a design, almost no liquid would escape from the interior 50 of the lower bearing cup 34 until the rotor 30 and the entire weight supported by it had been lifted high enough to clear the slotted openings 51.

Liquid leaving the central bore 44 of the shaft 23 by way of the opening 46 passes through a radial passage 57 in the rotor 30 to a check valve 58, and through that valve to an ascending passage 59 which discharges liquid under pressure into the interior 60 of the upper bearing cup 35. This liquid provides a pressure pad against any undesired upward thrust of the rotor 30. The sealing ring 38 is sufficiently loose to permit the desired leakage of liquid from the upper bearing cup 35.

It will be apparent that the rest bearing 53 will provide thrust bearing support whenever the hydraulic thrust bearing comprised of the rotor 30 and its associated bearing cups 34 and 35 fails to function, for example, during the period of start-up.

It will also be apparent that it is essential for the proper operation of the thrust bearing system 28 that liquid be continuously supplied under pressure through the line 40 regardless of whether the shaft 23 is being rotated in the usual direction under the impetus supplied by motor 20, when the power is on, or when shaft 23 is running in reverse to the usual motor drive direction by virtue of backward discharge of a column of water from the discharge pipe 13 through the pump 14 into the bottom of the well bore 10, a phenomenon which occurs when the power is shut off.

Note that liquid passing upward through shaft passage 14 may be partly diverted to lubricate the bearings of the motor 20, such bearings being of the same general construction as collar 41.

The pump 26 will pump liquid regardless of the direction of rotation, but its openings switch inlet and discharge functions with each reversal of rotation.

Figure 4:
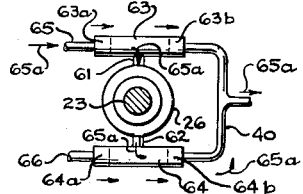
Figure 4 is a plan view of the circulating pump and associated check valves, as seen in the direction of the arrows 4—4 in Figure 2.

Figure 4 shows how the first and second openings, 61 and 62 can be provided with double valved inlet systems to insure constant flow through line 40. Openings 61 and 62 are connected to a pair of chambers 63 and 64 which have check valves 63a and 63b, and 64a and 64b at each end, said check valves being designed to permit flow only in the direction of the arrows alongside them. In Figure 4, normal operation of the pump 26, as driven by the motor 20, produces a flow from inlet 65, through check valve 63a, through the pump 26, and through check valve 64b to line 40. Check valves 63b and 64a are held shut by the distribution of liquid pressures. The direction of flow is indicated by the arrows 65a. No flow takes place through inlet 66.

When rotation is reversed, inflow takes place through inlet 66 and inlet 65 is idle, with corresponding changes in the direction of flow through the system to provide liquid under pressure to line 40.

The liquid 25, which is hermetically sealed in the housing 15, and is circulated through the thrust bearing system 28, is to be distinguished from the pumped liquid exterior to the housing 15 in the well bore 10. The latter may be sandy and dirty, whereas liquid 25 is an emulsion of oil and water which is confined to the system within the housing 15. The liquid 25 will be referred to herein, particularly in the claims, as bearing liquid, since it plays a role in the thrust bearing system 28. However, it is to be understood that this does not preclude its serving as a coolant and/or lubricant for the motor 20 or other parts of the system.

While I have described one specific embodiment of my invention in order to show how it can be embodied in a practical design, it will be obvious that the invention could be modified in many ways and adapted to many types of liquid pumps or hydraulic thrust bearings without departing from the spirit and scope of the inventive concept. It is therefore to be understood that the foregoing description does not restrict the invention to the particular features described or illustrated, but includes all variations thereof which fall within the limitations of the appended claims.

Having thus described my invention, what I claim as new and desire to secure by Letters Patent is:

1. A hydraulic thrust bearing for supporting a submersible pump shaft, which bearing includes: a hermetically sealed housing fastened against rotation; bearing liquid and a reservoir for said fluid within said housing; a bearing support structure within said housing; a part of said submersible pump shaft extending into said housing through the central part of said bearing support structure, said shaft portion being tubular for at least part of its length to provide a longitudinal passage within its interior; a lower bearing cup supported in said bearing support structure, and opening upwardly, said lower bearing cup having its side walls pierced by openings in the form of slots extending from the upper edge of said cup walls to a point spaced above the bottom of the interior of said cup; an upper bearing cup supported by said bearing support structure and opening downwardly toward said lower bearing cup; a bearing rotor mounted on said hollow part of said pump shaft and having a relatively small cylindrical upper bearing piston closely received in said upper bearing cup, and a relatively large diameter lower bearing piston closely received in said lower bearing cup; conduit means providing communication between said internal longitudinal passage in said shaft, and the interior of said upper bearing cup; conduit means placing said shaft passage in communication with the interior of said lower bearing cup, pump means for pumping said bearing liquid into said shaft passage by the rotation of said shaft in either direction.

2. A hydraulic thrust bearing for supporting a submersible pump shaft, which bearing includes: a hermetically sealed housing fastened against rotation; bearing liquid and a reservoir for said fluid within said housing; a bearing support structure within said housing; a part of said submersible pump shaft extending into said housing through the central part of said bearing support structure, said shaft portion being tubular for at least part of its length to provide a longitudinal passage within its interior; a lower bearing cup supported in said bearing support structure, and opening upwardly, said lower bearing cup having its side walls pierced by openings in the form of slots extending from the upper edge of said cup walls to a point spaced above the bottom of the interior of said cup; an upper bearing cup supported by said bearing support structure and opening downwardly toward said lower bearing cup; a bearing rotor mounted on said hollow part of said pump shaft and having a relatively small cylindrical upper bearing piston closely received in said upper bearing cup, and a relatively large diameter lower bearing piston closely received in said lower bearing cup; rest bearing means providing thrust bearing support for said bearing rotor at rest; walls defining an upper bearing passage within said bearing rotor, said passage providing communication between said internal longitudinal passage in said shaft, and the interior of said upper bearing cup; check valve means in said upper bearing passage permitting flow only in the direction of said upper bearing cup; walls defining a lower bearing passage through said bearing rotor, and placing said shaft passage in communication with the interior of said lower bearing cup; check valve means associated with said lower bearing passage, and adapted to permit flow only in the direction of said lower bearing cup; pump means for pumping said bearing liquid into said shaft passage, said pump means being operated by the rotation of said shaft in either direction, and said pump means including a pair of check valves at each of its openings to provide flow to said shaft interior independent of the direction of passage of liquid through said pump means.

3. A hydraulic thrust bearing for supporting a submersible pump shaft, and an electric motor rotor attached thereto, within a hermetically sealed motor housing containing liquid and a reservoir for said liquid, which bearing includes: a bearing support structure within said housing above said motor rotor; a part of said submersible pump shaft extending into the upper end of said housing through the central part thereof and supporting a motor rotor at its lower end, said shaft portion being tubular for at least part of its length to provide a longitudinal passage in its interior; walls defining passages from the shaft interior to the bearing of said motor; a lower bearing cup supported in said bearing support structure, and opening upwardly, said lower bearing cup having its side walls pierced by openings in the form of slots extending from the upper edge of said cup walls to a point spaced above the bottom of the interior of said cup; an upper bearing cup supported by said bearing support structure and opening downwardly toward said lower bearing cup; a bearing rotor mounted on said shaft at the upper end of its hollow part and having a relatively small cylindrical upper bearing piston closely received in said upper bearing cup, and a relatively large diameter lower bearing piston closely received in said lower bearing cup; rest bearing means supported in said lower bearing cup, and providing thrust bearing support for said bearing rotor at rest; walls defining an upper bearing passage within said bearing rotor, said passage providing communication between said internal longitudinal passage in said shaft, and the interior of said upper bearing cup; check valve means in said upper bearing passage permitting flow only in the direction of said upper bearing cup; walls defining a lower bearing passage through said bearing rotor, and placing said shaft passage in communication with the interior of said lower bearing cup; check valve means associated with said lower bearing passage, and adapted to permit flow only in the direction of said lower bearing cup; pump means mounted on said shaft below said motor rotor for pumping said bearing fluid into said shaft passage, said pump means being operated by the rotation of said shaft in either direction, and said pump means including a pair of check valves at each of its openings to provide flow to said shaft interior independent of the direction of passage of liquid through said pump means.

4. A hydraulic thrust bearing for supporting a submersible pump shaft, and to be located in a hermetically sealed motor housing, which bearing includes: bearing liquid and a reservoir for said fluid within said housing; a bearing support structure within said housing; a part of said submersible pump shaft extending into said housing through the central part of said bearing support structure, said shaft portion portion being tubular for at least part of its length to provide a longitudinal passage within its interior; a lower bearing cup supported in said bearing support structure, and opening upwardly, said lower bearing cup having its side walls pierced by openings in the form of slots extending from the upper edge of said cup walls to a point spaced above the bottom of the interior of said cup; an upper bearing cup supported by said bearing support structure and opening downwardly toward said lower bearing cup; a bearing rotor mounted on said shaft and having a relatively small cylindrical upper bearing piston closely received in said upper bearing cup, and a relatively large diameter lower bearing piston closely received in said lower bearing cup; rest bearing means supported in said lower bearing cup, and providing thrust bearing support for said bearing rotor at rest; walls defining an upper bearing passage within said bearing rotor, said passage providing communication between said internal longitudinal passage in said shaft, and the interior of said upper bearing cup; check valve means in said upper bearing passage permitting flow only in the direction of said upper bearing cup; walls defining a lower bearing passage through said bearing rotor, and placing said shaft passage in communication with the interior of said lower bearing cup; check valve means associated with said lower bearing passage, and adapted to permit flow only in the direction of said lower bearing cup; adjustment means for adjusting the valve opening pressure of at least one of said valves, said adjustment means having its adjustment point exposed in the portion of said bearing rotor between said upper and lower bearing cups; pump means for pumping said bearing liquid into said shaft passage, said pump means being operated by the rotation of said shaft in either direction, and said pump means including a pair of check valves at each of its openings to provide flow to said shaft interior independent of the direction of passage of liquid through said pump means.

5. A hydraulic thrust bearing for supporting a vertically loaded shaft, which bearing includes: a bearing rotor having cylindrical upper and lower ends coaxial with said shaft and mounted on said shaft to rotate therewith; a hermetically sealed housing fastened against rotation and entirely enclosing said bearing rotor and a portion of said vertically loaded shaft above and below said rotor; an upper bearing cup closely received on said shaft within said housing above said rotor, said bearing cup being supported from said housing, and having a lower cylindrical recess closely receiving the upper end of said rotor and permitting rotation and reciprocation of the upper end of said rotor within said upper bearing cup; a lower bearing cup closely received on said shaft below said rotor within said housing, said lower bearing cup being supported from said housing and having an upper cylindrical recess closely receiving the lower cylindrical end of said rotor and permitting both rotation and reciprocation of said rotor in said lower bearing cup; walls defining an internal longitudinal passage in said shaft extending from a point below said lower bearing cup and the region of said rotor, and having openings in open communication with said rotor; walls defining passages in said rotor from said openings at the interior of said shaft to the interiors of said upper and lower bearing cups; walls defining a discharge passage from the interior of at least one of said bearing cups to the interior of said housing; pump means operated by the rotation of said shaft for continuously pumping lubricant hermeticaly sealed within said housing into said longitudinal passage in said shaft and thence through said rotor to lubricate said bearing cups and support said vertically loaded shaft.

References Cited in the file of this patent

UNITED STATES PATENTS

| | | |
|---|---|---|
| 669,601 | Snow | Mar. 12, 1901 |
| 846,927 | Lasche | Mar. 12, 1907 |
| 2,854,298 | Baumeister | Sept. 30, 1958 |